Figure 1:
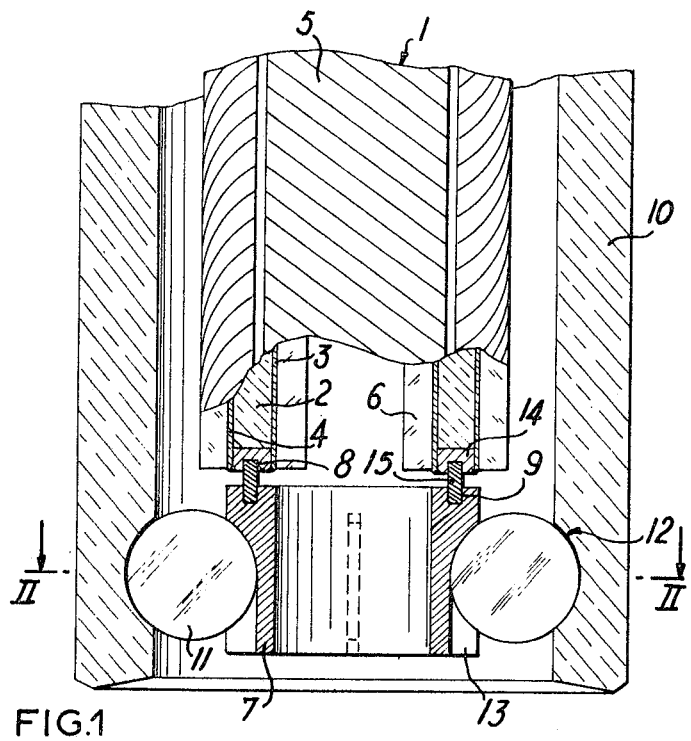

3,364,122
SUPPORT STRUCTURE FOR NUCLEAR
FUEL ELEMENTS
René Mombazet, Arpajon, and Noël Raynaud, Fontenay-aux-Roses, France, assignors to Commissariat à l'Energie Atomique, Paris, France
Filed Feb. 3, 1966, Ser. No. 524,759
Claims priority, application France, Feb. 19, 1965, 6,320
5 Claims. (Cl. 176—66)

This invention relates to an improvement made in support structures which are primarily intended to maintain nuclear fuel elements in a vertical position within the channels formed in the solid moderator stack of a nuclear reactor.

Among the fuel element support structures of this type which are at present known, one system in common use consists of a cylindrical sleeve of graphite or like material which supports each element by means of a bracket made either of metal or graphite and having the shape of a support grid or ring which is attached to the lower end of the sleeve body by means of flexible wires, said wires being preferably made of stainless steel.

However, a solution of this nature is attended by a certain number of drawbacks, especially when the fuel elements to be supported are of substantial size and weight. In fact, steel wires have low mechanical strength under operating conditions and are subject to appreciable creep under the action of the tractive forces exerted thereon as a result of the weight of the fuel elements. Furthermore, stainless steel wires are rapidly activated, which interferes to a certain extent with fuel discharging operations. Finally, the separation of the wires from the sleeve for the purpose of recovery of this latter after utilization constitutes a difficult operation. Moreover, production control prior to utilization invariably proves difficult.

The present invention is directed to a novel structure for supporting a fuel element in the vertical position which overcomes the disadvantages referred to above and which makes it possible in particular for the support bracket to work in compression under load and to permit of very easy recovery of the sleeve after utilization.

To this end, a support structure of the type comprising a bracket of generally cylindrical shape on which the base of said fuel element rests is characterized in that it comprises at least three discs which are uniformly spaced around the axis of said fuel element and engaged on the one hand in a toric groove formed in the internal surface of said sleeve and on the other hand in recesses which extend over a portion of the height of said cylindrical support bracket, said discs being held in position under the action of the pressure which is exerted on said cylindrical support bracket by the weight of said fuel element.

In a preferred form of embodiment, the discs consist of flat cylinders which are engaged in vertical slots machined in the cylindrical support bracket and the planes of the different discs pass through the axis of the sleeve and fuel element. In other alternative forms, the discs can have a slightly bulged central portion or can even be spherical, the shape of the slots of the cylindrical support bracket being modified accordingly. In addition, the sleeve, the support bracket and the discs can be fabricated of a same material which has a low neutron absorption cross-section such as graphite.

The manner in which one particular mode of application of the invention can be carried into effect will be more readily apparent from the complementary description which follows below in connection with one example of construction which is given by way of indication and not in any limiting sense.

Figure 2:
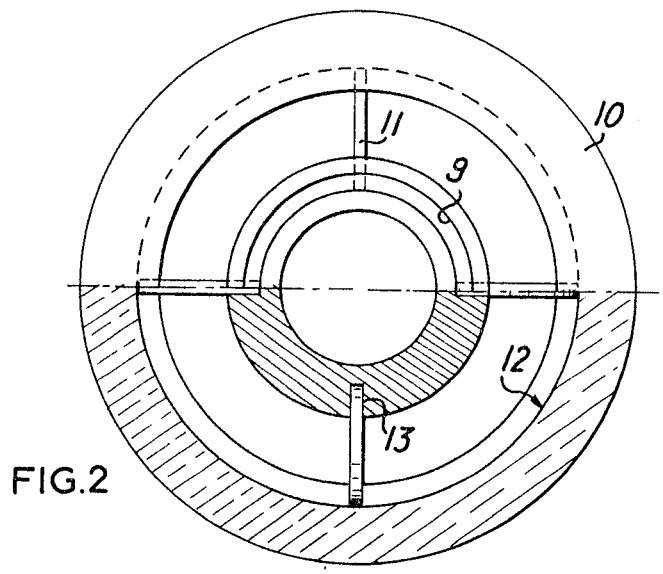

In the accompanying drawings:
FIG. 1 is a diagrammatic view in partial vertical cross-section of a fuel element which is supported within an annular sleeve by a structure which is designed in accordance with the invention;
FIG. 2 is a view in partial cross-section along line II—II of FIG. 1.

FIG. 1 shows a fuel element 1 which is made up of a central cylindrical portion 2 of fissionable material which is surrounded both internally and externally by two metallic cans such as the cans 3 and 4. As a preferable feature, the outer surface of the can 4 is provided with cooling fins such as the fin 5 which are oriented in a herringbone pattern around the periphery of the fuel element; the inner can 3 is provided with longitudinal fins 6. It must of course be noted that the shape and composition of the fuel element considered as well as the outer and inner cooling fins can be subject to a large number of alternative forms which do not in themselves have any influence on the support structure in accordance with the invention.

The support structure proper is composed of a cylindrical bracket 7 on which the base of the fuel element 1 is carried by means of a cylindrical bearing groove 8 formed in the end-cap 14, said groove being fitted over a ring 15 which is carried in a cylindrical groove 9 formed in the top surface of the support bracket. The fuel element is also placed vertically in the axis of an annular outer sleeve 10 which is constructed of any suitable material, preferably of graphite. The fuel element is supported within its sleeve by means of discs such as 11 which are four in number in the exemplified embodiment herein described and illustrated. As appears more readily from FIG. 2, said discs are in the form of thin cylinders and engage on the one hand in a toric groove 12 formed in the internal surface of the sleeve 10 at the base of this latter and, on the other hand, in vertical slots or recesses such as the recess 13 which are formed in the cylindrical support bracket 7.

It can accordingly be visualized that, by virtue of the arrangement hereinabove described, the cylindrical support bracket 7 is suitably locked within the sleeve 10 by means of its discs 11 under the action of the pressure exerted by the weight of the fuel element 1. The support bracket and the discs are thus only in compression under load and can be readily taken apart as soon as the fuel element is withdrawn from its sleeve. A particular result thereby achieved is that the production control of the different parts gives rise to only very few difficulties by virtue of the extremely simplified mode of assembly of said parts, as has become apparent from the above description.

Finally, it should be noted that the sleeve, the cylindrical support bracket and the discs can be formed of the same material, and in particular of graphite since this latter cannot be activated by exposure to radiation and consequently does not in any way complicate fuel element handling operations.

It must be clearly understood that this invention is not limited in any respect to the mode of construction which has been described and illustrated and which has been given solely by way of example.

What we claim is:
1. In a fuel element assembly, a support structure for supporting a fuel element in the vertical position in the longitudinal axis of an annular sleeve comprising a cylindrical bracket on which the base of said fuel element rests, at least three discs which are uniformly spaced around the axis of said fuel element and engaged in a toric groove formed in the internal surface of said sleeve and in recesses which extend over a portion of the height of said cylindrical support bracket, said discs being held in posi- tion under the action of the pressure which is exerted on said cylindrical support bracket by the weight of said fuel element.

2. Fuel element assembly as described in claim 1, said discs being flat thin cylinders with and the planes of said discs passing through the longitudinal axis of said sleeve.

3. Fuel element support structure in accordance with claim 1, said discs being spherical.

4. Fuel element support structure in accordance with claim 1, said discs having a slightly bulged central portion.

5. Fuel element support structure in accordance with claim 1, said sleeve, said cylindrical support bracket and said discs being formed of graphite.

References Cited

UNITED STATES PATENTS

| | | | |
|---|---|---|---|
| 2,877,170 | 3/1959 | Greenhalgh et al. | 176—77 X |
| 3,100,743 | 8/1963 | Aubert et al. | 176—87 |
| 3,134,722 | 5/1964 | Hespel et al. | 176—64 X |
| 3,147,194 | 9/1964 | Smith | 176—77 |
| 3,227,623 | 1/1966 | White | 176—77 |
| 3,247,076 | 4/1966 | Tutte et al. | 176—66 |

CARL D. QUARFORTH, *Primary Examiner.*

BENJAMIN R. PADGETT, *Examiner.*

M. J. SCOLNICK, *Assistant Examiner.*